US 6,529,246 B1

(12) United States Patent
Maeda

(10) Patent No.: US 6,529,246 B1
(45) Date of Patent: Mar. 4, 2003

(54) STATION SELECTOR

(75) Inventor: Osamu Maeda, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/220,346

(22) Filed: Dec. 24, 1998

(30) Foreign Application Priority Data

Dec. 26, 1997 (JP) .............................................. 9-011323

(51) Int. Cl.⁷ .............................. H04N 3/24; H04N 5/50
(52) U.S. Cl. ........................ 348/570; 348/569; 348/634; 348/731; 348/732
(58) Field of Search ................................ 348/569, 570, 348/731, 732, 734, 906, 633, 634, 635; H04N 5/50, 3/24

(56) References Cited

U.S. PATENT DOCUMENTS

| 3,984,828 A | * | 10/1976 | Beyers, Jr. ................... 345/144 |
| 4,214,273 A | * | 7/1980 | Brown ...................... 345/440.2 |
| 4,405,946 A | * | 9/1983 | Knight ......................... 348/554 |
| 4,536,797 A | * | 8/1985 | Maturo et al. ............... 358/183 |
| 5,103,314 A | * | 4/1992 | Keenan .................... 358/193.1 |
| 5,287,172 A | * | 2/1994 | Lee ............................. 348/635 |
| 5,299,010 A | * | 3/1994 | Nakazawa et al. .......... 348/731 |
| 5,301,028 A | * | 4/1994 | Banker et al. ............... 348/731 |
| 5,452,023 A | * | 9/1995 | Kim ............................. 345/731 |
| 5,754,258 A | * | 5/1998 | Hanaya et al. ............... 348/734 |
| 5,786,845 A | * | 7/1998 | Tsuria ............................ 348/9 |
| 6,091,459 A | * | 7/2000 | Masaike ....................... 348/569 |

FOREIGN PATENT DOCUMENTS

| JP | 61-257084 | 11/1986 |
| JP | 63-198280 | 12/1988 |
| JP | 7-307901 | 11/1995 |

* cited by examiner

Primary Examiner—John Miller
Assistant Examiner—Brian Yenke
(74) Attorney, Agent, or Firm—Crowell & Moring, LLP

(57) ABSTRACT

A station selector having a function of displaying a channel number on a screen. In the station selector, while channels are being switched through a remote control unit or the like, an OSD IC circuit is not operated and a selected station screen is displayed each time on a television set connected to an RF output terminal. Then, when the channel switching is completed and a synchronizing signal is output from a Y/C/A IC circuit, the actually selected station screen is displayed, then the OSD IC circuit is operated for displaying the channel number on the screen. When no synchronizing signal is output from the Y/C/A IC circuit, the OSD IC circuit is operated for displaying the channel number on a blue back.

7 Claims, 2 Drawing Sheets

STATION SELECTOR

BACKGROUND OF THE INVENTION

1. Field of the Invention

This invention relates to a station selector installed in a video cassette recorder (VCR), a television set or the like, and more particularly to a station selector having a function of displaying a channel number on a screen.

2. Description of the Related Art

Some video cassette recorders have a function of displaying a channel number on a screen of a television set or the like connected to a video output terminal of the video cassette recorder. In the internal configuration of this type of video cassette recorder, a typical circuitry (corresponding to a station selector) for selecting a broadcasting station in response to the operation of a remote control unit and displaying the selected channel number on a screen is disclosed in U.S. Pat. No. 4,405,946.

In the disclosed technique, if the user uses a remote control unit to switch a channel, the selected channel number is superposed on the screen and a program on the selected channel (station) appears on the screen in a predetermined time.

However, in the above conventional circuit, when the user switches channels rapidly, only channel numbers are displayed on the screen and programs on the channels being switched are not displayed on the screen; the user may be worried that the normal receiving operation may not be performed and it is pointed out that the operability is poor in this point. However, if the channel number display is not performed, the user does not see what channel appears on the screen, and the operability becomes poor in this point.

SUMMARY OF THE INVENTION

It is therefore an object of the invention to provide a station selector improved so as to enable the user to easily know the receiving operation during channel switching while the channel number display is performed.

In order to achieve the above object, according to the invention, there is provided a station selector comprising: a channel setting section for selecting a broadcasting station; a tuner section for extracting a broadcasting station signal from an antenna signal; a conversion section for converting a received signal output from the tuner section into a video signal; a synchronizing signal separation section for extracting a synchronizing signal from the video signal output from the conversion section; an on-screen display control section to which the video signal output from the conversion section is input for displaying a text, a figure, a symbol, or a uniform-color background on a screen; and a control circuit section for controlling the tuner section and the on-screen display control section based on a station selecting signal input through the channel setting section and the synchronizing signal input from the synchronizing signal separation section, wherein if a station selecting operation is being performed, the control circuit section displays a selected station screen of the video signal output from the conversion section without operating the on screen display control section, and if the station selecting operation has been completed and the synchronizing signal is input, the control circuit section displays a selected station screen of the video signal output from the conversion section, then operates the on-screen display control section for displaying a channel number on the selected station screen.

Further, there is provided a station selector comprising: a channel setting section for selecting a broadcasting station; a tuner section for extracting a broadcasting station signal from an antenna signal; a conversion section for converting a received signal output from the tuner section into a video signal; a synchronizing signal separation section for extracting a synchronizing signal from the video signal output from the conversion section; an on-screen display control section to which the video signal output from the conversion section is input for displaying a text, a figure, a symbol, or a uniform-color background on a screen; and a control circuit section for controlling the tuner section and the on-screen display control section based on a station selecting signal input through the channel setting section and the synchronizing signal input from the synchronizing signal separation section, wherein the control circuit section includes on-screen display operation inhibiting means for determining that a station selecting operation is being performed to place the on-screen display control section in a non-operation mode.

DETAILED DESCRIPTION OF THE PREFERRED EMBODIMENT

Figure 1:
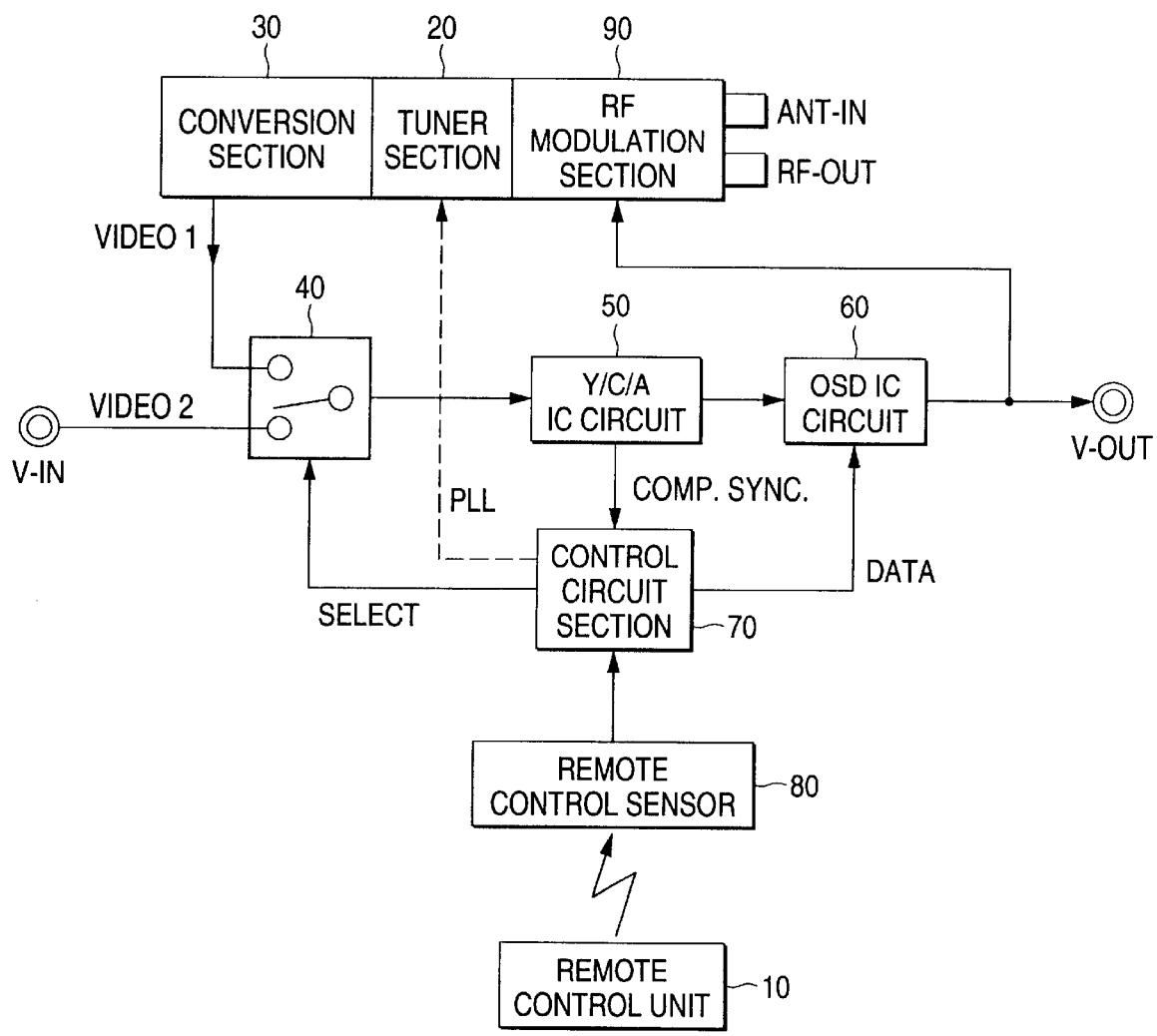
FIG. 1 is a diagram for describing an embodiment of the invention and is a block diagram of a station selector installed in a video cassette recorder.
Figure 2:
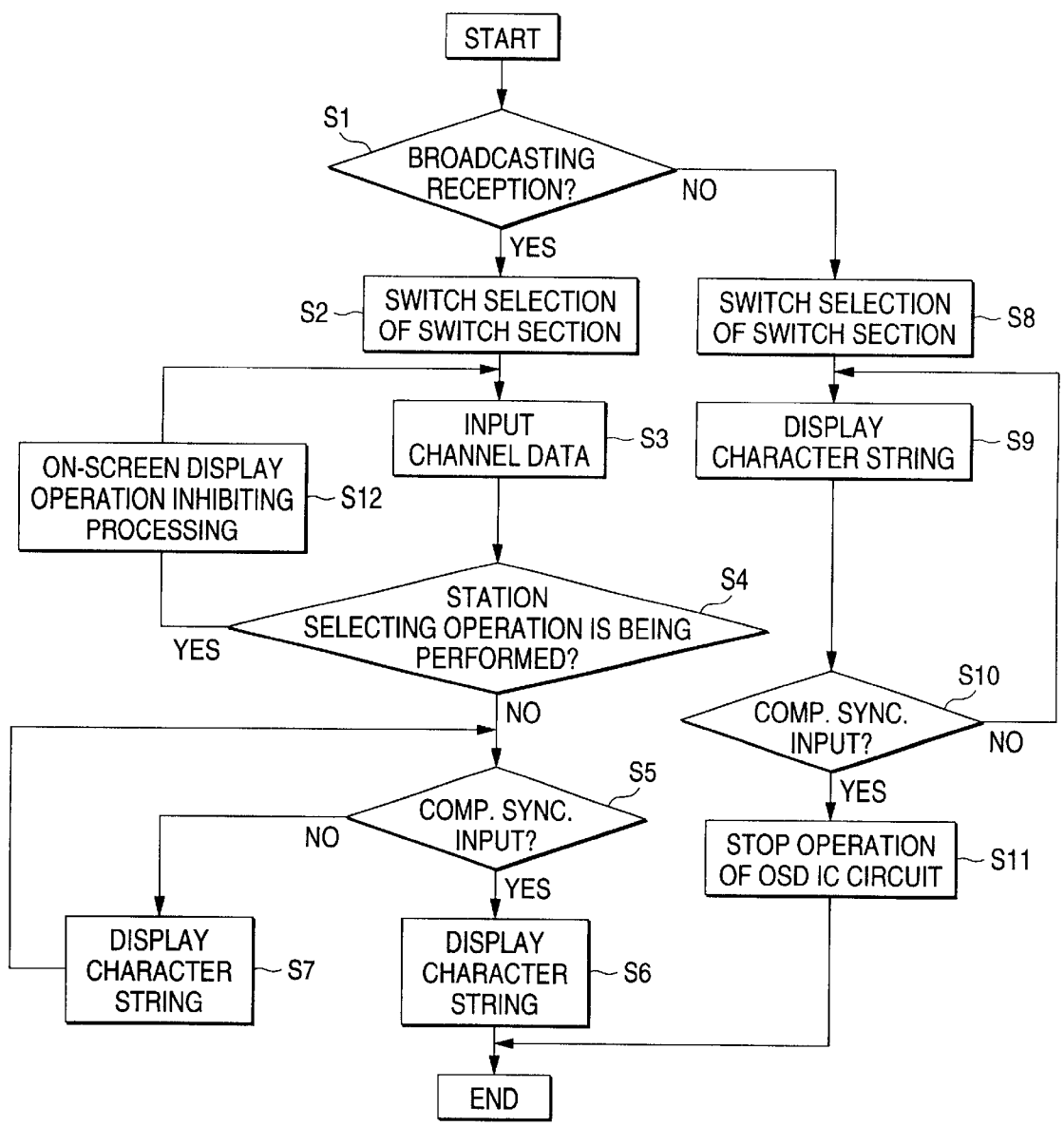
FIG. 2 is a flowchart of a program executed in a control circuit section of the station selector.

Referring now to the accompanying drawings, there is shown a preferred embodiment of a station selector of the invention with a video cassette recorder as an example. FIG. 1 is a block diagram of a station selector installed in a video cassette recorder. FIG. 2 is a flowchart of a program executed in a control circuit section of the station selector.

The video cassette recorder here taken as an example records and reproduces video signals on a magnetic tape (not shown) and is provided with an external video input terminal (V-IN) and an external antenna input terminal (ANT-IN) as external input terminals and also a video output terminal (V-OUT) and an RF output terminal (RF-OUT) as output terminals.

A video machine such as a video disc player is connected to the external video input terminal (V-IN) and a VHF broadcasting antenna is connected to the external antenna input terminal (ANT-IN). A television set or the like is connected to the video output terminal (V-OUT) or the RF output terminal (RF-OUT).

The video cassette recorder is provided with a station selector for selecting a broadcasting station in response to the operation of a remote control unit or the like and for displaying the selected channel number on a screen of the television set connected to the video output terminal (V-OUT) or the RF output terminal (RF-OUT).

As shown in FIG. 1, the station selector has a basic configuration comprising a remote control unit 10 (corresponding to a channel setting section) for selecting a broadcasting station and the like, a tuner section 20 for extracting a broadcasting station signal from an antenna signal input through the external antenna input terminal (ANT-IN), a conversion section 30 for converting a received signal output from the tuner section 20 into a video signal, a Y/C/A IC circuit 50 having a function (as a synchronizing signal separation section) of extracting a synchronizing signal (COMP SYNC.) from the video signal input through a switch section 40 from the conversion section 30, an OSD IC circuit 60 (corresponding to an on-screen display control section) to which the video signal output from the Y/C/A IC circuit 50 is input for displaying a text, a figure, a symbol, or a uniform-color background on a screen, and a control circuit section 70 for controlling the tuner section 20, the switch section 40, and the OSD IC circuit 60 based on a station selecting signal input through the remote control unit 10 or the like and the synchronizing signal (COMP SYNC.).

The remote control unit 10 is provided for remotely controlling the video cassette recorder and makes an infrared LED or the like to emit light in response to the operation result of an operation button (not shown) for transmitting an operation code signal. The remote control unit 10 is provided with not only recording, reproducing, fast-forwarding, and fast-reversing operation buttons, but also operation buttons for performing set input such as switch of external input, selection of a broadcasting station (containing a function of continuously selecting broadcasting stations), and the like. Further, operation buttons (not shown) having the same functions as those of the remote control unit 10 are also placed on a front panel of the video cassette recorder.

The operation code signal transmitted as an infrared signal from the remote control unit 10 is received at a remote control sensor 80, which is an infrared receiving diode for converting the received operation code signal into an electric signal and outputting the electric signal to the control circuit section 70.

The tuner section 20 is a circuit for extracting a signal of a given VHF broadcasting station from the antenna signals input from the external antenna input terminal (ANT-IN). The receiving frequency is controlled based on a PLL signal (described later) generated by the control circuit section 70.

A VHF broadcasting antenna (not shown) is connected to the external antenna input terminal (ANT-IN) and the antenna signal is input to the tuner section 20 via a UHF tuner consisting of a mixing circuit, a local oscillation circuit, and the like.

The conversion section 30 performs intermediate frequency conversion and demodulation for the received signal output from the tuner section 20 and converts the signal into a video signal (video1). The conversion section 30 is made up of a frequency conversion circuit, a video intermediate-frequency amplification circuit, and a video detection circuit.

The video signal (video1) is output via the switch section 40, the Y/C/A IC circuit 50, and the OSD IC circuit 60 to the-video output terminal (V-OUT) and an RF modulation section 90. The RF modulation section 90 modulates the signal and- outputs the modulated signal to the RF output terminal (RF-OUT).

The switch section 40 is a circuit for selecting the video signal (video1) input from the conversion section 30 or a video signal (video2) input from the external video input terminal (V-IN). Here, a 2-input and 1-output analog switch or the like is used. The selection between the video signals (video1 and video2) is controlled through an external input switch signal (select) generated by the control circuit section 70. The video signal output from the switch section 40 is led into the Y/C/A IC circuit 50.

The Y/C/A IC circuit 50 has a basic configuration for performing modulation processing to record the video signal input from the switch section 40 on the magnetic tape, demodulation processing to convert an FM (frequency-modulated) signal reproduced from the magnetic tape into a video signal, and the like. The Y/C/A/ IC circuit 50 also has a function of extracting a chroma signal, an audio signal, and a synchronizing signal (COMP. SYNC) from the video signal. The synchronizing signal (COMP. SYNC) is led into the control circuit section 70.

The OSD IC circuit 60 employs an on-screen display IC on the market and operates in response to a command (DATA) generated by the control circuit section 70. At the operation time, a video signal for displaying a channel number on the screen of the television set or the like connected to the video output terminal (V-OUT) or the RF output terminal (RF-OUT) is output to the video output terminal (V-OUT) and the like. At the non-operation time, no processing is performed for the video signal output from the Y/C/A IC circuit 50 and the video signal is output as it is.

The OSD IC circuit 60 contains a memory in which character data or the like has been previously recorded. If the command (DATA) generated by the control circuit section 70 (DATA) is to instruct a character string such as CH1 to be displayed at a predetermined position on a blue back, the OSD IC circuit 60 generates a video signal to display the character string such as CH1 on the blue back on the screen of the television set or the like in such a manner that a signal with the B component of the RGB signal emphasized is generated, character data for CH1 in the memory is scanned, and the character data is superposed on the signal.

The control circuit section 70 is a circuit for controlling the whole video cassette recorder in response to the operation of the remote control unit 10 or the like. Here, the control circuit section 70 employs a microcomputer. A program for controlling the whole video cassette recorder is recorded in a memory of the control circuit section 70 and also a control program of the switch section 40, the tuner section 20, the OSD IC circuit 60, and the like is recorded therein. The program contents and the operation of the station selector will be discussed below.

When the set input of external input by the operation of the remote control unit 10 or the like changes, an interrupt program shown in FIG. 2 is executed. First, whether the set external input is broadcasting reception or video is determined at step S1.

If it is determined that the external input is broadcasting reception, an external input switch signal (select) for switching the selection of the switch section 40 is generated at step S2. Then, a video signal (video1) input from the external antenna input terminal (ANT-IN) and passed through the tuner section 20 and the conversion section 30 is input through the switch section 40 to the Y/C/A IC circuit 50.

Next, data of the channel input by the operation of the remote control unit 10 or the like is input and a PLL signal responsive to the channel data is generated and output to the tuner section 20 at step S3. Whether or not the channel data input within a predetermined time has changed, namely, whether the station selecting operation is being performed or has been completed is determined at step S4.

If the channel is switched by the operation of the remote control unit 10 or the like in a state in which the external input is broadcasting reception, processing is started from step S3.

If it is determined that the station selecting operation is being performed (channels are being switched), control returns to step S3 and similar processing to that described above is performed through processing for inhibiting the on-screen display operation at step S12. On-screen display operation inhibiting means for executing the on-screen display operation inhibiting processing is provided in the control circuit section 70.

At this time, the video signal (video1) is output via the Y/C/A IC circuit 50, the OSD IC circuit 60, and the RF modulation section 90 to the RF output terminal (RF-OUT). The OSD IC circuit 60 is in a non-operation mode because the on-screen display operation is inhibited at step S12, but the RF modulation section 90 is in an operation mode, thus selected station screens during the station selecting operation are displayed as it is on the television set connected to the RF output terminal (RF-OUT) without a uniform-color background or the like superposed.

If it is determined that the station selecting operation has been completed (channel switch has been completed), whether or not a synchronizing signal (COMP. SYNC) has been input from the Y/C/A IC circuit 50 is determined at step 5. Since the synchronizing signal (COMP. SYNC) is contained in the video signal (video1) input to the Y/C/A IC circuit 50, whether or not the video signal (video1) has been actually input from the external antenna input terminal (ANT-IN) is determined at step S5.

If it is determined that the synchronizing signal has been input, a command (DATA) is prepared for operating the OSD IC circuit 60 in several seconds after the completion of the station selecting operation, and displaying the character string indicating the determined channel (for example, "CH1" if the determined channel is 1) at a predetermined position on the selected station screen at step S6.

The OSD IC circuit 60 is in the non-operation mode for several seconds after the completion of the station selecting operation, thus the broadcasting screen on channel 1 is displayed on the television set. After this, when the OSD IC circuit 60 operates, the character data of "CH1" is superposed on the video signal (video1). Resultantly, the white character string of "CH1" is superposed on the broadcasting screen. The interrupt program shown in FIG. 2 is now completed.

If it is determined that the synchronizing signal has not been input, a command (DATA) is prepared for operating the OSD IC circuit 60 and displaying the character string indicating the determined channel at a predetermined position on a blue back at step S7. Then, control returns to step S5 and similar processing to that described above is performed.

Then, a video signal is generated from the OSD IC circuit 60 and is output through the RF modulation section 90 to the video output terminal (V-OUT). Resultantly, output of a screen with the white character string indicating the channel displayed on the blue back is continued on the television set until the set input such as channel switch is changed.

On the other hand, if it is determined that the external input is video, an external input switch signal (select) for switching the selection of the switch section 40 is generated at step S8. Then, a video signal (video2) input from the external video input terminal (V-IN) is input through the switch section 40 to the Y/C/A IC circuit 50.

Then, a command (DATA) is prepared for operating the OSD IC circuit 60 and displaying a character string of "VIDEO" or the like at a predetermined portion on the blue back at step S9.

Then, a video signal is generated from the OSD IC circuit 60 and is output to the video output terminal (V-OUT). Thus, a screen with the white character string of "VIDEO" or the like superposed on the blue back is output to the television set or the like connected to the video output terminal (V-OUT). In this state, the RF modulation section 90 does not operate, thus no signal is output from the RF output terminal (RF-OUT).

Next, whether or not a synchronizing signal (COMP. SYNC) has been input from the Y/C/A IC circuit 50 is determined at step S10. Since the synchronizing signal (COMP. SYNC) is contained in the video signal (video2) input to the Y/C/A IC circuit 50, whether or not the video signal (video2) has been actually input from a video machine such as a video disc player connected to the external video input terminal (V-IN) is determined at step S10.

If it is determined that the synchronizing signal (COMP. SYNC) has been input, a command (DATA) is prepared for stopping the operation of the OSD IC circuit 60 after a lapse of one or two seconds at step S11.

Then, the video signal (video2) output from the Y/C/A IC circuit 50 passes through the OSD IC circuit 60 and is output to the video output terminal (V-OUT). Thus, the white character string of "VIDEO" or the like is displayed on the blue back on the television set or the like and is changed to a video screen reproduced by the video machine such as a video disc player in one or two seconds. The interrupt program shown in FIG. 2 is now completed.

If it is determined that the synchronizing signal (COMP. SYNC) has not been input, control returns to step S9. Thus, output of a screen with the white character string of "VIDEO" or the like displayed on the blue back is continued on the television set or the like connected to the video output terminal (V-OUT) until the set input of external input is changed.

With the station selector, even if the channels are switched consecutively, the screens of the channels being switched are displayed, so that the user can easily know whether or not the normal receiving operation is performed. Upon completion of switching the channels, the actually selected station screen is displayed and then the channel number is displayed on the screen, so that the user can easily know what channel the actually displayed screen corresponds to. Moreover, when the video signal of the selected broadcasting station is not input, the channel number is displayed on the blue back, thus the user can also easily know that the reception is impossible.

In addition, if the external input is changed to video, a screen with the white character string of "VIDEO" or the like displayed on the blue back is output to the television set or the like only for one or two seconds. Thus, the user can know at a glance that the external input has been switched as set. Particularly, the channel number is displayed in white, namely, in a color different from the background color, thus is extremely easy to see. When no change is made from the blue back screen after a lapse of one or two seconds, the user can also easily know that there is a cause such that the cable is not connected to the external video terminal (V-IN) as predetermined. Therefore, the operability of the video cassette recorder can be made better.

The station selector of the invention can be applied not only to a video cassette recorder, but also to a television set or the like, of course. The on-screen display control section may be of any configuration if it can superpose a channel number on the selected station screen and display the channel number on a uniform-color background. The whole screen need not necessarily be made a uniform-color background; the background of the display area of the character string indicating the channel in the screen may be provided in a uniform color. Further, the same function as the program executed in the control circuit section may be provided by hardware.

As described above, according to the station selector of the invention, even if the channels are switched rapidly, the screens of the channels being switched are displayed, so that the user can easily know whether or not the normal receiving operation is performed. Further, upon completion of switching the channels, the actually selected station screen is displayed and then the channel number is displayed on the screen, so that the user can easily know what channel the actually displayed screen corresponds to.

What is claimed is:

1. A station selector comprising:
   a channel setting section for selecting a broadcasting station;
   a tuner section for extracting a broadcasting station signal from an antenna signal;
   a conversion section for converting a received signal output from said tuner section into a video signal;
   a synchronizing signal separation section for extracting a synchronizing signal from the video signal output from said conversion section;
   an on-screen display control section to which the video signal output from said conversion section input for displaying a text, a figure, a symbol, or a uniform-color background on a screen; and
   a control circuit section for controlling said tuner section and said on-screen display control section based on a station selecting signal input through said channel setting section and the synchronizing signal input from said synchronizing signal separation section,
   wherein if a station selecting operation is being performed, said control circuit section displays a selected station screen of the video signal output from said conversion section as it is without operating said on-screen display control section, and if the station selecting operation has been completed and the synchronizing signal is input, said control circuit section displays a selected video signal output from said conversion section, then operates said on-screen display control section for displaying a channel number on the selected station screen.

2. The station selector as claimed in claim 1, wherein if the station selecting operation has been completed and the synchronizing signal is not input, said control circuit section operates said on-screen display control section for displaying a channel number on a uniform-color background.

3. The station selector as claimed in claim 2, wherein a character string including a channel number is displayed in a color different from the color of the uniform-color background.

4. The station selector as claimed in claim 1, wherein said channel setting section enables a broadcasting station selection to be switched consecutively.

5. The station selector according to claim 1, wherein if the station selecting operation is being performed, the control circuit section displays the selected station screen of the video signal output from the conversion section as it is without operating the on-screen display control section.

6. A station selector comprising:
   a channel setting section for selecting a broadcasting station;
   a tuner section for extracting a broadcasting station signal from an antenna signal;
   a conversion section for converting a received signal output from said tuner section into a video signal;
   a synchronizing signal separation section for extracting a synchronizing signal from the video signal output from said conversion section;
   an on-screen display control section to which the video signal output from said conversion section input for displaying a text, a figure, a symbol, or a uniform-color background on a screen; and
   a control circuit section for controlling said tuner section and said on-screen display control section based on a station selecting signal input through said channel setting section and the synchronizing signal input from said synchronizing signal separation section,
   wherein said control circuit section includes on-screen display operation inhibiting means for determining that a station selecting operation is being performed to place said on-screen display control section in a non-operation mode, in which the broadcasting station selected by the channel setting section is output as it is for display.

7. The station selector according to claim 6, wherein in the non-operation mode, the broadcasting station selected by the channel setting section is output as it is for display.

* * * * *